Figure 1:
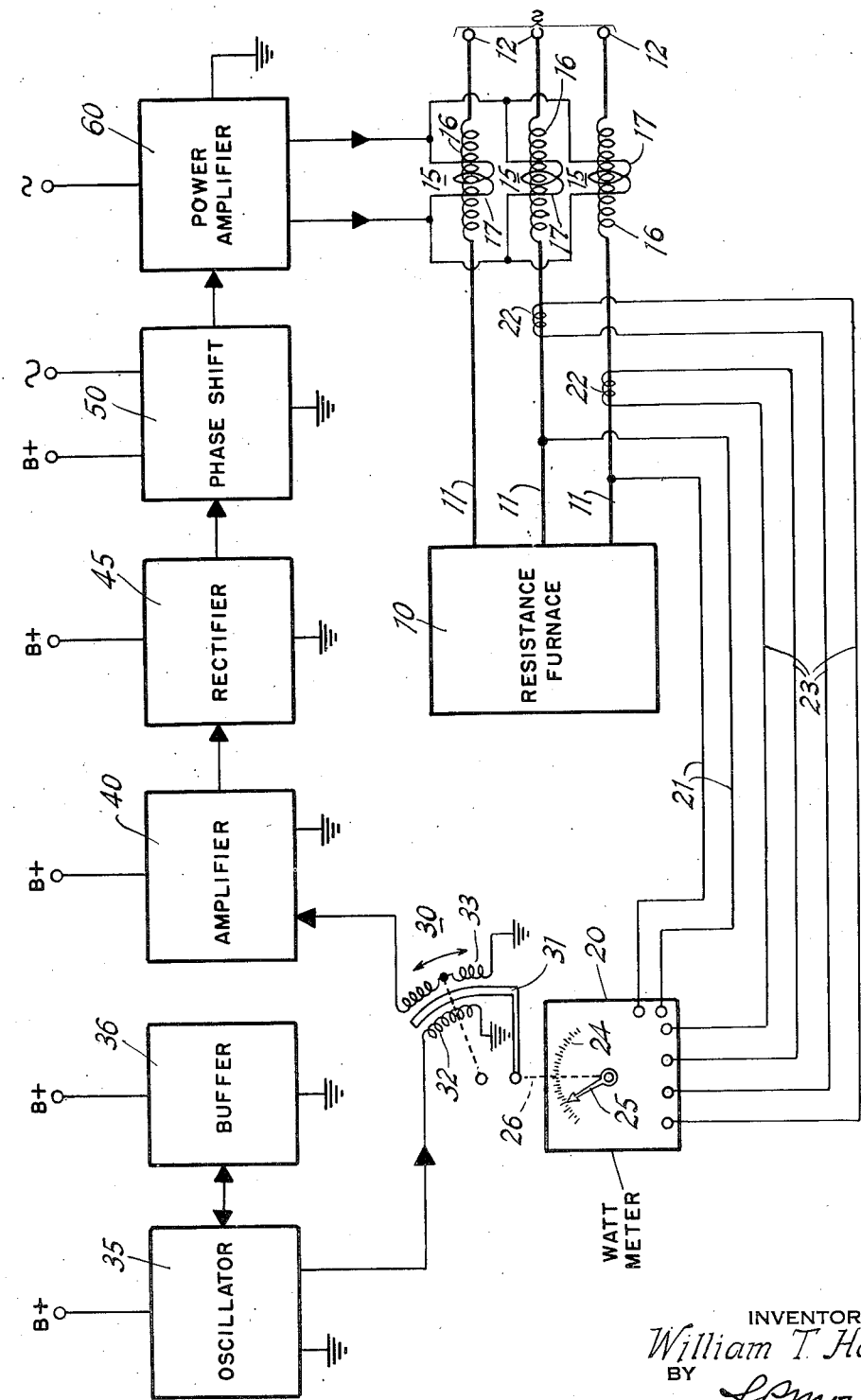

July 2, 1957  W. T. HAGE  2,798,196
POWER REGULATING SYSTEM FOR RESISTANCE FURNACES
Filed Aug. 28, 1952  2 Sheets-Sheet 1

INVENTOR
William T. Hage
BY
/s/ Moran
ATTORNEY

INVENTOR
William T. Hage
BY
JP Moran
ATTORNEY

United States Patent Office 2,798,196
Patented July 2, 1957

2,798,196

POWER REGULATING SYSTEM FOR RESISTANCE FURNACES

William T. Hage, Alliance, Ohio, assignor to The Babcock & Wilcox Company, New York, N. Y., a corporation of New Jersey Application August 28, 1952, Serial No. 306,771

6 Claims. (Cl. 323—66)

This invention relates to power control systems and, more particularly, to a system arranged to maintain constant the supply of electric power to a load by modulating the power input responsive to variations of the indicator of a power input measuring device from a pre-set value.

In many instances, such as in electrically energized furnaces, it is desirable to maintain the power input to the load at a constant value. This may be done as a form of temperature control or to maintain a uniform power input per unit of time. While control systems have been proposed to effect a constant power input, there is a demand for such a system which will effectively maintain power input at a very constant value over an extended period of time, and particularly without the use of circuit controlling contactors such as relays and then like.

When such contactors are used, the trouble-free time of the system is limited by deterioration of contacts opening and closing under load, requiring dressing or replacing of the contacts. The contact deterioration is especially rapid with the relatively heavy currents required with large loads, such as resistance furnaces.

In contradistinction of the foregoing, the present invention provides a system for maintaining a constant power input to an electrical load characterized in that the only moving part of the system is the core of a linearly variable differential transformer, this core being connected to be moved by the indicator component of a power measuring device such as a wattmeter. Control of the power is effected in response to variations of the position of the wattmeter indicator from a pre-set value, such value being adjustable. When the power input is at the pre-set value, there is no effective signal from the differential transformer. When the power varies from the pre-set value, the resulting signal from the transformer secondary is amplified, rectified, and utilized to control the current flow through the D. C. control coil of a saturable reactor. The resulting change in effective inductance of the reactor power coil is utilized to shift the phase of the grid potential of a pair of "Thyratrons" relative to the plate potential thereof. These "Thyratrons" control the current flow through the control coil or coils of one or more saturable reactors whose power coils are connected between the source of power and the load. Thereby, the current flow to the load is continuously modulated in accordance with measured power input to the load. By virtue of the absence of any moving parts except the transformer core, which does not have any physical engagement with any other component, the system has continuous reliability and high accuracy coupled with long term dependability.

Figure 2:
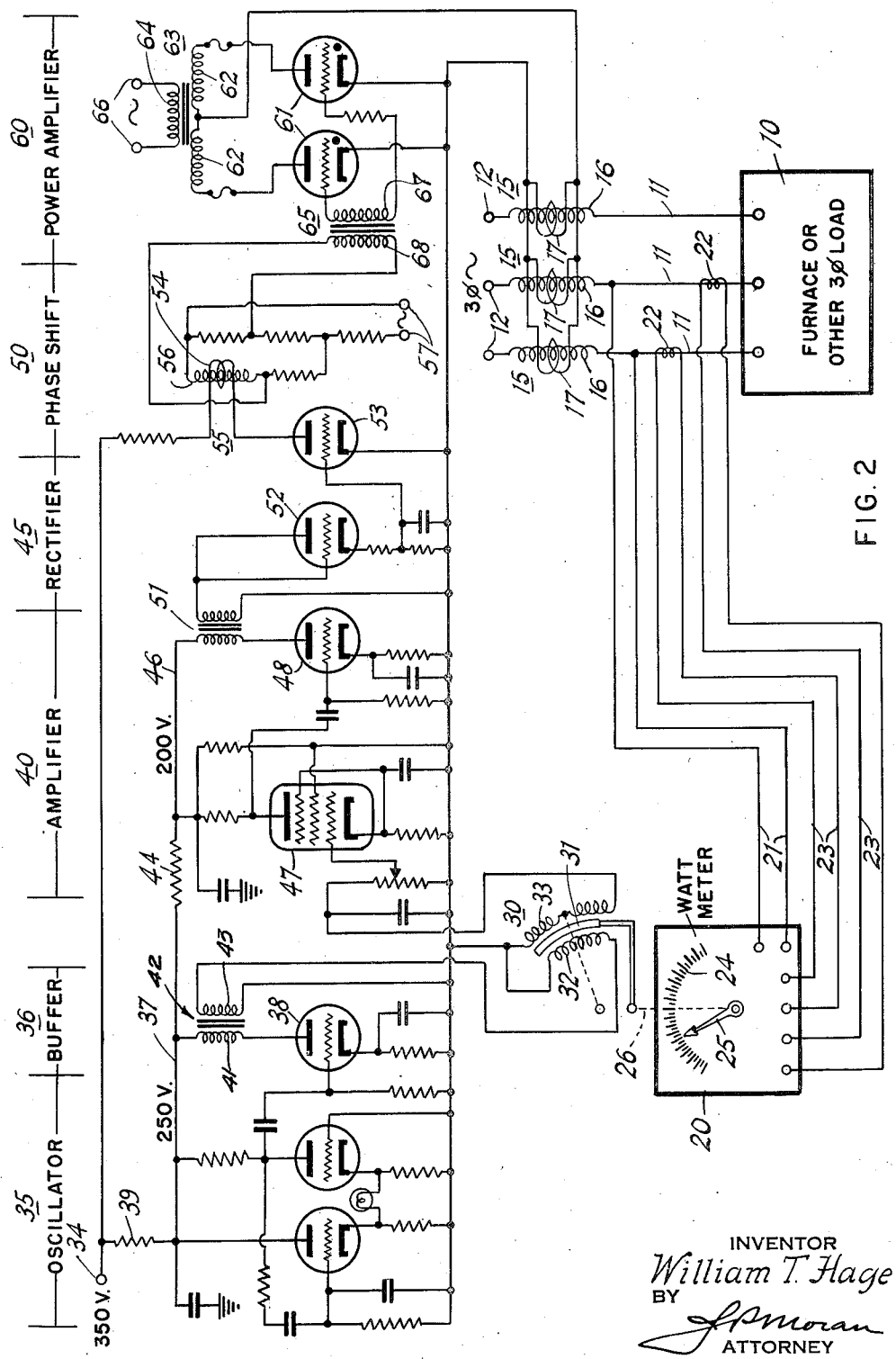

For an understanding of the invention principles, reference is made to the following description of a typical embodiment thereof as illustrated in the accompanying drawings. In the drawings:

Fig. 1 is a block diagram of a constant power control system for a three phase resistance furnace; and Fig. 2 is a schematic wiring diagram of the system shown in Fig. 1.

Referring first to Fig. 1, a three-phase resistance furnace 10 is illustrated as energized over conductors 11 receiving power from a suitable A. C. source connected to terminals 12. For a purpose to be described, the power coils 16 of saturable reactors 15 are each connected in series in one of the conductors 11.

A wattmeter 20 is connected in the usual manner to conductors 11, its voltage coils being connected across a pair of the conductors by lines 21 and its current coils being connected to current transformers 22, in two of the conductors 11, by conductors 23. Wattmeter 20 is provided with a movable indicating needle 25 cooperable with the usual scale 24. The shaft 26 of needle 25 is schematically illustrated as having secured thereto a movable core 31 of a linear variable differential transformer 30 having grounded primary winding 32 and a grounded two section secondary winding 33. The latter is schematically illustrated as adjustable relative to core 31.

An A. C. potential of a suitable frequency is applied to primary winding 32 from oscillator 35 having a buffer 36 associated therewith. The position of secondary winding 33 is so adjusted, relative to the position of wattmeter needle 25, that there will be no effective signal produced from secondary winding 33 when indicator 35 registers the desired power input to furnace 10. This may be termed the so-called "neutral" value, and variations of the output of transformer 30 in either direction from such neutral output value provide triggering signals to the control system in accordance with the direction of the variation.

Assuming that needle 25 indicates a value other than the desired power input value, the resultant effective signal from transformer 30 is amplified in an amplifier 40 and rectified in a rectifier 45. The amplified and rectified signal is fed to a phase-shift circuit 50 where it controls the flow of direct current through the control coil of a saturable reactor to vary the saturation of the reactor and thus the effective inductance of the reactor power coil. This power coil, by virtue of any change in its effective inductance, controls the phase relation of the grid potentials of a pair of "Thyratrons" relative to the plate potentials thereof. These "Thyratrons" are part of a power amplifier, indicated at 60, which controls the flow of direct current through the control coils 17 of saturable reactors 15.

The current flow through control coils 17 is varied in such a manner as to change the effective inductance of power coils 16 in a direction to restore the power input to furnace 10 to the desired value. When the power input attains such pre-set value, needle 25 will have moved to indicate the same and transformer core 31 will be correspondingly shifted to a position wherein the output of transformer 30 is at the "neutral" value and no effective control signal is produced.

From the foregoing, it will be seen that an effective modulating control of the power input is provided without the use of any contactors or of any moving parts other than the core of the differential transformer. Consequently, the invention constant power control system can remain operable over long periods of time determined only by the effective life of the electronic components thereof.

The internal circuits of the blocks of Fig. 1 are schematically illustrated in Fig. 2. The oscillator is supplied with plate potential from a suitable source 34 which may be, for example, 350 volts, a resistor 39 reducing this potential to 250 volts in a potential supply line 37. The A. C. output of the oscillator is applied to the control grid of a tube 38 forming part of buffer 36. The primary winding 41 of a transformer 42 is connected in the plate circuit of tube 38, and the secondary winding 43 of the transformer is connected across the primary winding 32 of differential transformer 30. A resistor 44 reduces the plate potential to 200 volts in the line 46. This is the plate potential of amplifier 40.

The output of secondary winding 33 of the differential transformer is applied to the control grid of an amplifier tube 47 whose output is in turn supplied to the control grid of a triode 48. A transformer 51 couples the output of amplifier 40 to the input of the first tube 52 of rectifier 45. The output tube 53 of the rectifier has the control coil 54 of a saturable reactor 55 connected in its plate circuit. The power coil 56 of reactor 55 is connected across an A. C. source at terminals 57, through a voltage dividing network.

The power amplifier 60 includes a pair of "Thyratrons" 61 connected for full wave rectification across the secondary windings 62 of a power supply transformer 63 whose primary winding 64 is energized from an A. C. source connected to terminals 66. The grids of "Thyratrons" 61 are connected to opposite terminals of the secondary windings 67 of a transformer 65 whose primary winding 68 is connected in series with the power coil 56 of saturable reactor 55. The output of "Thyratrons" 61 is connected to the three control coils 17 of saturable reactors 15 in parallel.

As well known to those skilled in the art, the term "Thyratron" is a trade-name designating a hot cathode gas discharge tube in which one or more grid electrodes are employed to control electrostatically the starting of the unidirectional current flow. The duration of current flow is dependent upon the relative phase relation of the grid or input potential and the plate or output potential. Specifically, during a given positive half-cycle of output potential, current flows only during such time as the input potential is likewise going through a positive half-cycle, and the current flow in the output circuit is interrupted whenever the input potential "goes negative" or whenever the output potential is going through a negative half-cycle. Such a device is described on page 3, line 2 of "Electronics Dictionary" by Cooke and Markus, published in 1945 by McGraw-Hill Book Company, Inc., of New York.

The value of the amplified and rectified control signal applied to the control coil 54 of reactor 55 correspondingly varies the saturation of this reactor and thus the effective inductance of the reactor power coil 56. Variations in the inductance of power coil 56 correspondingly vary the phase of the grid potential of "Thyratrons" 61 relative to the plate potential thereof. This correspondingly shifts the firing points of the "Thyratrons" to control the time during which the latter pass current to control coils 17 during each cycle. Hence, the effective current flow through control coils 17 is varied in accordance with the signal potential from differential transformer 30.

This variation is in a direction to change the effective inductance of power coils 16 in such manner as to restore the current flow to load 10 to the pre-set value. As stated, when such pre-set value is re-attained, wattmeter needle 25 will have moved transformer core 31 to the neutral position and no effective signal will be applied to the control circuit until such time as the input to load 10 again varies from the pre-set value.

While a specific embodiment of the invention has been shown and described in detail to illustrate the application of the invention principles, it will be understood that the invention may be embodied otherwise without departing from such principles.

What is claimed is:

1. In combination, an electric power consuming load; a source of A. C. electric power; saturable reactor means having power coil means connected between said source and said load, and D. C. control coil means; electronic valve means supplying control current to said control coil means and having an output current variable in accordance with the phase relation of its input and output potentials; an inductance connected in the input circuit of said electronic valve means; a power measuring device connected to measure the power input to said load and having a component movable in accordance with such power input; differential transformer means coupled between a source of A. C. potential and said inductance to vary the effective value of said inductance, in accordance with the effective coupling of said differential transformer means, to vary the relative phase relation of the input and output potentials of said electronic valve means to vary the control current through said control coil means to vary the inductance of said power coil means; and an instrumentality connected to said component and operatively associated with said differential transformer to vary the effective coupling of the latter, responsive to movements of said component, to modulate the power input to said load to maintain the power input substantially constant.

2. The combination claimed in claim 1 in which said instrumentality comprises a movable core of said differential transformer.

3. The combination claimed in claim 2 in which said device is a wattmeter and said core is connected to the movable indicator of said wattmeter.

4. The combination claimed in claim 1 in which said inductance comprises the power coil of a second saturable reactor and said differential transformer means is coupled to the control coil of said second saturable reactor.

5. The combination claimed in claim 4 including rectifying and amplifying means connected between said differential transformer and the control coil of said second reactor.

6. The combination claimed in claim 1 in which said electronic valve means comprises grid-controlled, gaseous discharge electronic valves.

References Cited in the file of this patent

UNITED STATES PATENTS

| 772,096 | Hallberg | Oct. 11, 1904 |
| 1,566,980 | Seede | Dec. 22, 1925 |
| 1,943,463 | Van Ohlsen et al. | Jan. 16, 1934 |
| 2,158,135 | MacFarlane | May 16, 1939 |
| 2,306,998 | Claesson | Dec. 29, 1942 |
| 2,558,094 | King | June 26, 1951 |
| 2,561,329 | Ahlen | July 24, 1951 |
| 2,624,035 | Stevens et al. | Dec. 30, 1952 |